Nov. 23, 1971  F. L. GIRAUD  3,621,787
MARSHALLING PROCESS AND DEVICE FOR GROUND
EFFECT TRANSPORTATION
Filed Jan. 28, 1969
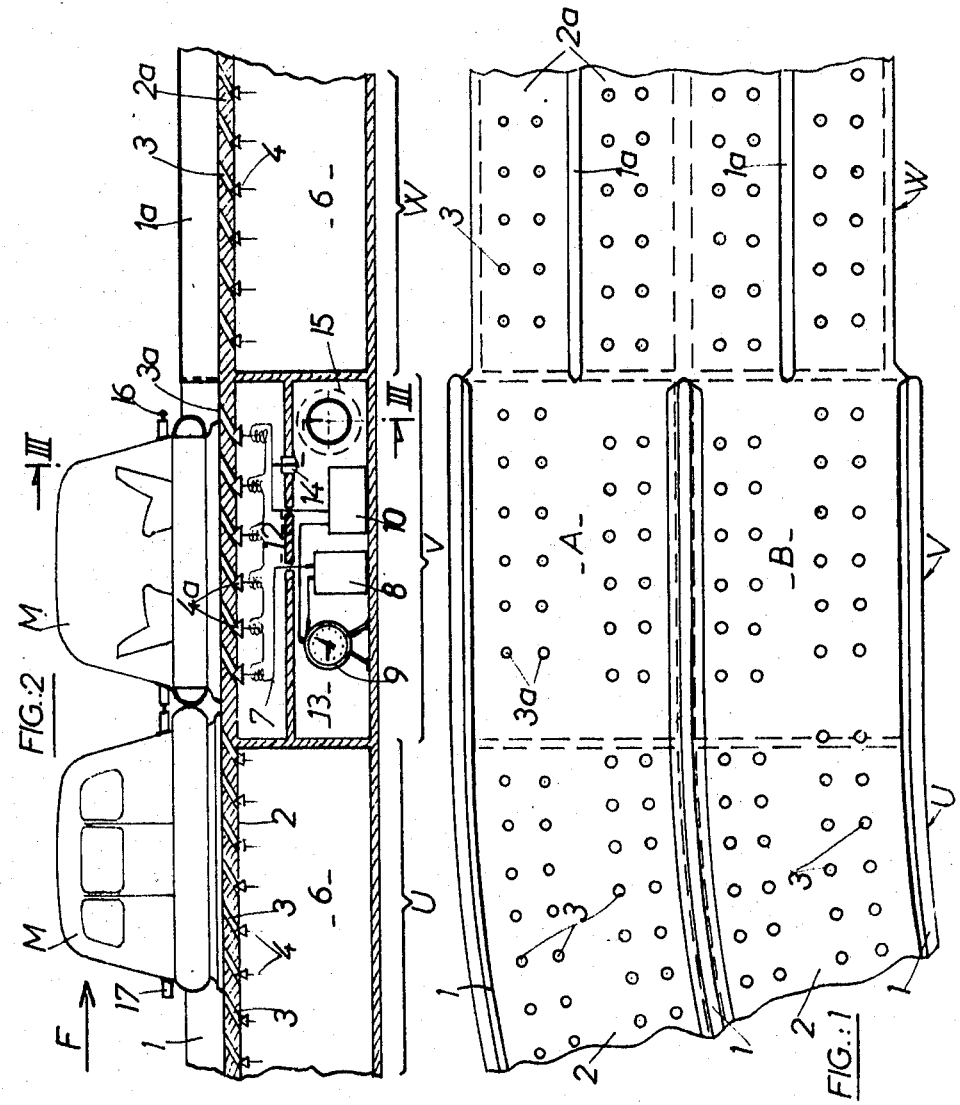
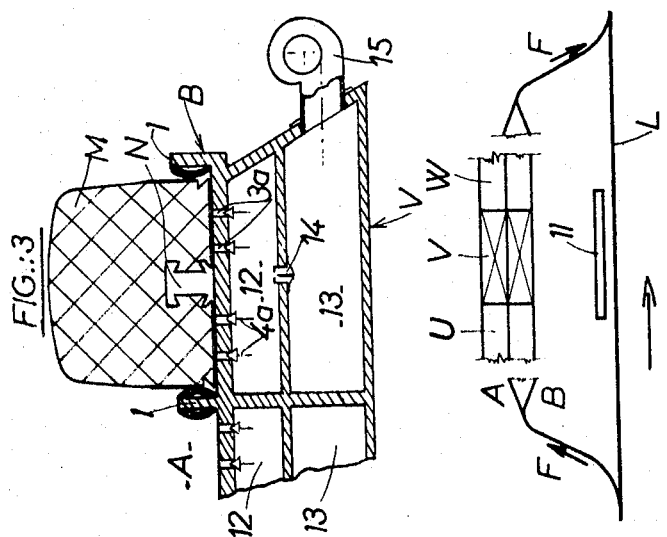
INVENTOR
FRANCOIS L. GIRAUD
By Stevens, Davis, Miller & Mosher
ATTORNEYS

United States Patent Office 3,621,787
Patented Nov. 23, 1971

3,621,787
MARSHALLING PROCESS AND DEVICE FOR GROUND EFFECT TRANSPORTATION
François Louis Giraud, Plaisir, France, assignor to Societe de l'Aerotrain, Paris, France
Filed Jan. 28, 1969, Ser. No. 794,651
Claims priority, application France, Mar. 27, 1968, 145,717
Int. Cl. B61b *13/08*
U.S. Cl. 104—23 FS  2 Claims

ABSTRACT OF THE DISCLOSURE

A ground effect transportation system has a marshalling yard by-passing a main line and having a station area which is fluidically activatable by means of valve-controlled pressure fluid jets distributed thereon; a carriage is switched from said main line into said marshalling yard and propelled towards said station area which is first de-activated during a predetermined lapse of time thereby eliminating ground effect thereon and immobilizing said carriage as it overlies the area, then re-activated thereby restoring ground effect and carriage movability thereon; the carriage is thereafter propelled over said marshalling yard and switched into said main line.

---

Ground-effect transportation systems have been proposed in which vehicles or other machines move along a prepared track on interposed cushions of pressurised fluid fed from the track, the latter being provided to this end with the necessary arrangements for the development of the ground-effect support, and in particular with a piping arrangement which distributes pressurised fluid through multiple discharge orifices arranged at intervals along the track and controlled by obturator devices so designed that only those orifices are open which at a given instant are located opposite a vehicle, the others remaining closed in order to prevent any unnecessary loss of fluid. Thus, in these transportation systems, there is provided an active track and passive machines.

The present invention is particularly significant in terms of application to ground-effect transportation systems of this kind, and in the following the term "movable body" or "carriage" will be employed to designate the passive machine carrying the payload, and the term "fluidic track" to designate the active track which provides a layer or cushion of pressurised fluid.

The invention relates more particularly to a kind of marshalling yard for movable machines of this kind, so that trains can be formed up and can move off directly on the main track or, preferably, on a branch track joining same, the manoeuvre of marshalling being carried out automatically in such a way that space departure times are achieved all in accordance with the traffic density on the track.

In accordance with the invention, there is provided in the marshalling yard a parking section to which the movable bodies are routed and which is temporarily held in an inoperative or unfluidised condition by deliberate obturation of the associated fluid-discharge orifices. The result is that the first movable body which arrives on this section is halted because of the lack of any lift by ground-effect, and remains there, the next movable body, continuing to move, then hitting the first, stationary one and coupling up with it, and so on. At the end of a predetermined time which is a function of the number of movable bodies which is to make up the train, or a function of the time for which the first vehicle has been stationary, and provided also that the track is clear at that time, the active or fluidised condition of said parking section is re-established by supplying fluid through its discharge orifices, thus restoring the ground-effect and discontinuing the immobilisation of the movable body which is at the head of the train so that the train thus formed can now depart. Self-evidently, the train can have any desired number of movable bodies and in the extreme condition, could be comprised by a single such body only.

The invention also extends to means of implementing the aforesaid marshalling operation, by the appropriate control of the discharge orifices of the said parking section. In one embodiment of the invention these orifices are normally obturated by solenoid valves in the energising circuit of which there is included a clock timer or other timer control so adjusted as to produce the differential opening of said solenoid valves, and whose operation is preferably associated with that of a relay which is sensitive to the traffic density on the main track and so designed as to keep said excitation circuit in the open-circuit condition as long as the said main track is not clear.

In the accompanying drawings:

FIG. 1 is a schematic plan view of a marshalling yard in accordance with the invention;

FIG. 2 is a longitudinal section through same;

FIG. 3 is a transversal section on the line III—III of FIG. 2; and

FIG. 4 is a very much simplified diagram of a marshalling area.

The marshalling area illustrated in the drawing is composed of three successive and distinct sections U, V, W, comprising a plurality of tracks (in the embodiment illustrated only two neighbouring tracks A and B have actually been shown).

Each track of the section U will advantageously have a concave section of channel-like form, the lips 1 of which act as guides and the base 2 of which is provided with discharge orifices 3 in the form of nozzles inclined in the direction of travel F of the movable bodies M.

These nozzles are normally obturated by valves 4 which open automatically when a movable body M passes opposite the nozzles 3, thus producing jets of fluid which, on the one hand, produce the desired ground-effect, and on the oher hand propel the movable body M in the direction F. In other words, the fluidically activatable end section U is effectively activated or de-activated automatically, depending upon whether or not a carriage such as M is present thereon. The pressurised fluid arrives through a conduit 6 integral with the track and made up of hollow profiled sections.

The fluidically activatable end section W is similar to the preceding one with the exception that its cross-section is in the form of an inverted T; it has a central guide rib 1a which is straddled by the movable body M due to the provision of a longitudinal slot N provided in it for the purpose, and also has lateral wings 2a to provide the lift function.

It is the intermediate section V which is more particularly the subject of the present invention. It has the same general configuration as the section U of which it forms an extension, but differs in terms of the arrangements which it has for supplying the nozzles 3a.

The latter are imperatively controlled by solenoid valves 4a whose excitation circuit 7 is closed across a voltage source 8 by a clock device 9 and a relay 10, the latter in turn being controlled by an appropriate traffic detector 11 (see FIG. 4). Thus the fluidically activatable intermediate section V is selectively activated or de-activated imperatively, irrespective of whether or not a carriage such as M is present thereon. The set of solenoid valves 4a is located in a space 12 which communicates with a main 13 through one or more calibrated orifices 14; the main 13 is supplied with pressurised fluid by a compressor 15 for example.

The marshalling area just described will advantageously be set back in relation to a main ground-effect track L (FIG. 4) and be connected thereto by branch tracks and suitable switching arrangements. It operates in the following manner:

The movable body M, for example a vehicle designed to carry passengers, may be stationary or moving slowly along a platform. The passengers enter and leave the vehicle, in which case it is halted momentarily if it happens to be moving.

The movable body traverses the section U, being supported and propelled by jets of fluid which are produced when it passes over the nozzles 3 with their automatic valves 4, and arrives on a track A or B of section V.

The solenoid valves 4a are normally in the closed position so that the said first movable body thus arrives on a unfluidised section of track and consequently ceases to be supported and propelled. It therefore settles and halts on this track section V, the length of which is approximately equivalent to that of the movable body.

A second movable body moving along this track will hit the first and is automatically coupled to it due to the provision of a coupling head 16 and a female taper 17, and so on for third and other movable bodies.

The arrival of the first movable body upon the parking section V is appropriately detected and triggers the clock device 9 which, after a predetermined time, causes the solenoid valves 4a to open, provided that at this time the relay 10 is closed, which is the case if the detector 11 signals that the track L is clear.

The nozzles 3a are then supplied with pressurised fluid which fills the space 12 and the track section V is fluidised, causing the train which has been marshalled in the aforedescribed fashion to start to move so that it enters the section W leading towards the main track L.

The departure of the training from the marshalling area automatically produces the open-circuiting of the circuit responsible for the excitation of the solenoid valves 4a, and the resetting to zero of the clock device 9, so that a second train can now be formed up in the manner above described.

It will be observed that the space 12, after having been discharged by the opening of the solenoid valves 4a, does not immediately fill up again because of the provision of the calibrated passage 14, this producing a certain lag in the pressure build-up. Thus, if, as a consequence of some fault, one or more of the solenoid valves 4a should jam in the open position, the parking section V will not be continuously fluidised and any movable body M, arriving there soon after the departure of the previously marshalled train, will be halted for a certain time so that in all circumstances the trains formed up on the marshalling area can be made to depart at certain absolute minimum intervals, which provides security against the possibility of collision.

Obviously, in the case envisaged, where there are several tracks arranged side by side in the marshalling area, the control systems for the various parking sections V will be combined in order to stagger departures.

What is claimed is:

1. In a ground effect transportation system having a plurality of carriages movable over a track including a main line and a by-pass marshalling yard with an inlet end section and an outlet end section respectively connected to said line and with a station area section which extends intermediate said end sections, all three sections being fluidically activatable by a multiplicity of valve-controlled pressure-fluid jets distributed thereon, said end sections being effectively activated or de-activated automatically depending upon whether or not a carriage is present thereon and said intermediate section being selectively activated or de-activated imperatively irrespective to whether or not a carriage is present thereon, a process for marshalling said carriages comprising the steps of switching a carriage from said main line into said marshalling yard through said inlet end section thereof, propelling said carriage over said marshalling yard towards said station area section, de-activating imperatively said fluidically activatable station area section thereby to elminate ground effect thereon and to positively immobilize said carriage as it overlies said station area section while leaving at the same time said end sections activated subject to the presence thereon of a carriage, maintaining said station area section imperatively de-activated during a predetermined minimum lapse of time from carriage arrival thereon while still leaving all the time said end sections activated subject to the presence thereon of a carriage, re-activating imperatively said station area section after said lapse of time thereby to restore ground effect thereon and movability of said carriage overlying said station area section with said end sections being still in activated condition subject to the presence thereon of a carriage, propelling said carriage over said marshalling yard towards said outlet end section thereof, and switching said carriage into said main line.

2. Marshalling process as claimed in claim 1, comprising the further steps of de-activating anew said station area after departure therefrom of said carriage, keeping said station area thus de-activated until arrival thereon of a further carriage, still maintaining said station area de-activated during a further predetermined minimum lapse of time, and thereafter re-activating said station area anew until departure of said further carriage.

References Cited

UNITED STATES PATENTS

| | | | |
|---|---|---|---|
| 319,335 | 6/1885 | Smith | 104—23 FS |
| 3,512,481 | 5/1970 | Hershey | 104—23 FS |
| 3,037,462 | 6/1962 | Barry | 104—18 |
| 3,242,876 | 3/1966 | Berggren | 104—134 |

ARTHUR L. LA POINT, Primary Examiner

D. W. KEEN, Assistant Examiner

U.S. Cl. X.R.

104—27, 134